E. L. DELANY.
AUXILIARY TOILET SEAT.
APPLICATION FILED JUNE 2, 1919.
1,334,137.
Patented Mar. 16, 1920.
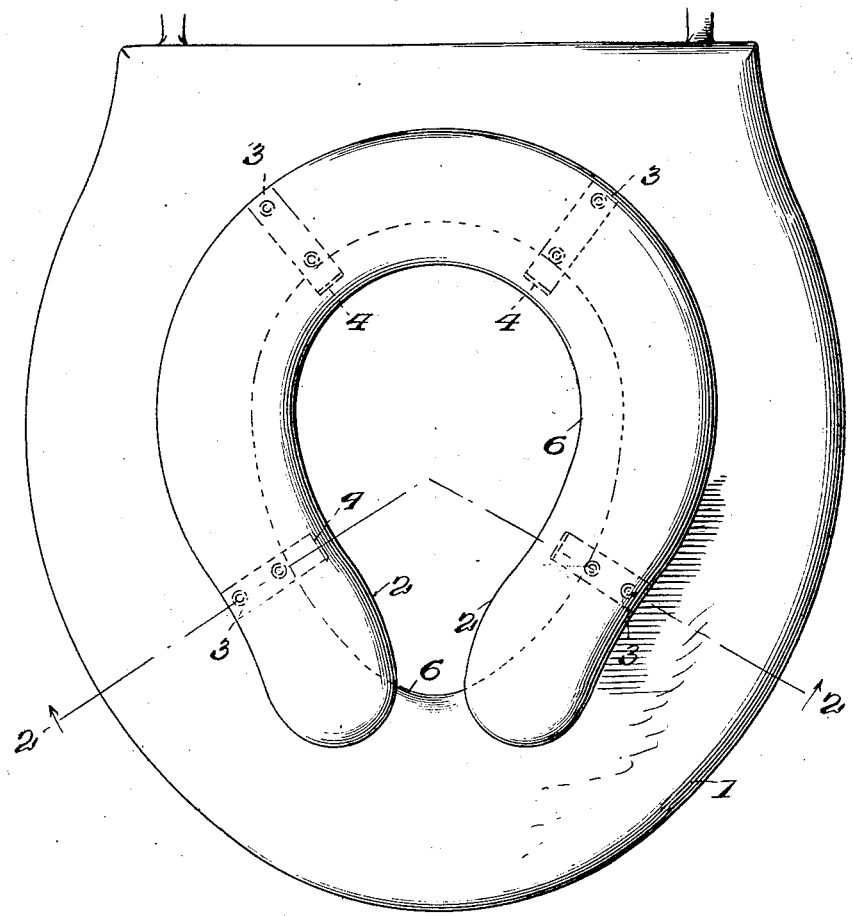
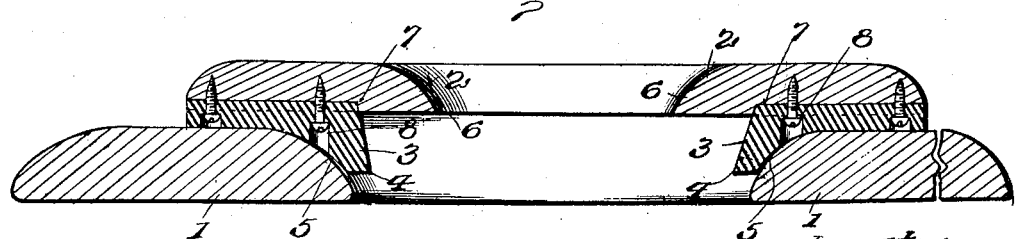
Inventor
E. L. Delany.

UNITED STATES PATENT OFFICE.

EDWARD L. DELANY, OF BROOKLYN, NEW YORK.

AUXILIARY TOILET-SEAT.

1,334,137.　　　　　Specification of Letters Patent.　　Patented Mar. 16, 1920.

Application filed June 2, 1919. Serial No. 301,307.

*To all whom it may concern:*

Be it known that I, EDWARD L. DELANY, of Brooklyn, in the county of Kings and State of New York, have invented certain new and useful Improvements in Auxiliary Toilet-Seats; and I do hereby declare the following to be a full, clear, and exact description of the invention, such as will enable others skilled in the art to which it appertains to make and use the same.

My object is to provide an improved auxiliary seat for the use of babies, having especially in view a seat adapted to any standard seat, with no permanent attachments to the main seat but capable of being readily placed in and removed from position, and at the same time equipped with means for preventing it from slipping out of place.

In the drawing, Figure 1 is a plan view and Fig. 2 a section on line 2—2.

The main seat 1 is of conventional design having its inner edge curved downward. 2 is the auxiliary seat of any preferred material. It is equipped with a series of radially disposed buffer stays 3, or "bumpers," as they are known commercially. They may be made of rubber, felt or other soft but strong composition to render them essentially buffers and prevent marring the surface of the main seat, and also to provide an air space between the main and auxiliary seats.

In order to act as stays tending to prevent the auxiliary seat from slipping out of place each of the buffers is formed with a downward extending flange 4 whose lower surface 5 is curved to correspond to the main seat. By employing four of these buffer stays at substantially the points indicated the flanges 4 provide ample security against accidental slipping or displacement. At the same time they permit the auxiliary seat to be readily removed as no locking devices are necessary.

The inner rim 6 of the auxiliary seat projects well beyond the buffer stays. As appropriate means for securing the stays I have shown the under side of the seat formed with channel 7 about half an inch wide to receive the stays and the stays are made with countersinks 8 to receive screws or tacks.

I claim as my invention:

As an article of manufacture, a removable auxiliary seat for toilet seats having no permanent attachment to the main seat, and having a series of radially disposed spaced apart buffer stays formed with downward extending flanges whose under surfaces are adapted to conform to the contour of the inner rim of the main seat, the inner rim of said auxiliary seat projecting well beyond said buffer stays.

In testimony whereof I have signed this specification.

EDWARD L. DELANY.